US012397555B2

(12) United States Patent
Reffke et al.

(10) Patent No.: US 12,397,555 B2
(45) Date of Patent: Aug. 26, 2025

(54) PRINTER DEVICE AND WET CLEANING PROCESS OF A PRINTER DEVICE

(71) Applicant: MULTIVAC MARKING & INSPECTION GMBH & CO. KG, Enger (DE)

(72) Inventors: Michael Reffke, Roedinghausen (DE); Bernd Rath, Enger (DE)

(73) Assignee: MULTIVAC Marking & Inspection GmbH & Co. KG, Enger (DE)

( * ) Notice: Subject to any disclaimer, the term of this patent is extended or adjusted under 35 U.S.C. 154(b) by 149 days.

(21) Appl. No.: 18/195,659

(22) Filed: May 10, 2023

(65) Prior Publication Data

US 2023/0364916 A1 Nov. 16, 2023

(30) Foreign Application Priority Data

May 10, 2022 (DE) ......................... 102022111562.3

(51) Int. Cl.
*B41J 2/175* (2006.01)
*B41J 2/165* (2006.01)
*B41J 2/17* (2006.01)

(52) U.S. Cl.
CPC ......... *B41J 2/1714* (2013.01); *B41J 2/16511* (2013.01)

(58) Field of Classification Search
CPC .... B41J 29/13; B41J 2202/20; B41J 2202/21; B41J 2202/14; B41J 2/17503; B41J 2/1752; B41J 2/17536
See application file for complete search history.

(56) References Cited

U.S. PATENT DOCUMENTS 4,410,900 A * 10/1983 Terasawa ............. B41J 2/16511 347/30
2018/0056657 A1* 3/2018 Murakami ........... B41J 2/17523
2021/0040338 A1* 2/2021 Contractor ............. C09D 11/38

FOREIGN PATENT DOCUMENTS

DE 10 2013 217 685 A1 3/2015
DE 10 2018 204 794 A1 10/2019
DE 10 2020 105 974 A1 9/2021
JP 2014061607 A * 4/2014

OTHER PUBLICATIONS

Tsukui, Machine TranslationofJP-2014061607-A, 2014 (Year: 2014).*
German Search Report Dated Dec. 24, 2022, Application No. 10 2022 111 562.3, Applicant Multivac Marking & Inspection GmbH & Co. KG, 8 Pages.

* cited by examiner

*Primary Examiner* — Scott A Richmond
(74) *Attorney, Agent, or Firm* — Brooks Kushman P.C.

(57) ABSTRACT

The disclosure relates to a printer device configured for a packaging machine as a thermal inkjet printer. The printer device includes a frame and a printhead holder mounted thereon and configured to support a replaceable printhead. The printhead holder has an opening for at least one nozzle formed on the printhead. The printer device further includes a sealing unit and a lifting mechanism for the sealing unit, by means of which the sealing unit is adjustable between a first position, in which the sealing unit exposes the opening of the printhead holder, and a second position, in which the sealing unit closes the opening of the printhead holder. Furthermore, the disclosure relates to a wet cleaning process of a printer device.

17 Claims, 6 Drawing Sheets

PRINTER DEVICE AND WET CLEANING PROCESS OF A PRINTER DEVICE

CROSS REFERENCE TO RELATED APPLICATIONS

This application claims foreign priority benefits under 35 U.S.C. § 119(a)-(d) to German patent application number DE 10 2022 111 562.3, filed May 10, 2022, which is incorporated by reference in its entirety.

TECHNICAL FIELD

The present disclosure relates to a printer device, which is configured in the form of a thermal inkjet printer for a packaging machine. Furthermore, the disclosure relates to a wet cleaning process of a printer device.

BACKGROUND

In practice, thermal inkjet printers are already used on thermoforming packaging machines as direct foil printers for printing on a top foil material web. Wet cleaning processes of such thermoforming packaging machines are complex to prepare, since direct foil printers mounted thereon are difficult to seal or print heads installed thereon are removed individually. Furthermore, it is difficult to cover the printhead holders used for the printheads owing to electrical contacts contained therein. Accordingly, preparation for a wet cleaning process has been quite time-consuming and costly.

SUMMARY

It is an object of the disclosure to provide a printer device for a packaging machine and to enhance the printer device to the extent that a wet cleaning process on the packaging machine is more feasible. Furthermore, it is an object of the disclosure to provide a correspondingly optimized wet cleaning process.

This object is addressed by means of a printer device according to disclosure and by means of a wet cleaning process according to the disclosure.

Advantageous further embodiments of the disclosure are defined by the subject-matter of the dependent claims.

The disclosure relates to a printer device configured for a packaging machine as a thermal inkjet (TIJ) printer, the printer device including a frame and at least one printhead holder mounted thereon and configured to support a replaceable printhead. The printhead holder includes an opening for at least one nozzle formed on the printhead. Characteristically, the printer device has a sealing unit and a lifting mechanism for the sealing unit, by means of which the sealing unit is adjustable between a first position, in which the sealing unit exposes the opening of the printhead holder, and a second position, in which the sealing unit closes the opening of the printhead holder. Thus, the printer device according to the disclosure, in particular the nozzle of the printhead, may be sealed, in particular for a wet cleaning process, by an operator within a short time without any effort. According to the disclosure, the sealing unit and the lifting mechanism used for it are provided as integral components of the printer device, so that loose closures are no longer used for sealing the nozzle of the printhead. By means of the lifting mechanism, the sealing unit may be easily adjusted by an operator without having to touch the printhead holder or the sealing unit. Automated actuation of the lifting mechanism would be conceivable as a supplement or alternative to manual actuation. Adjusting the sealing unit via the lifting mechanism ensures improved hygienic operation overall.

It is conceivable that the sealing unit may be used in different scenarios on the printer device to close the opening. On the one hand, it would be conceivable for the sealing unit itself to be used as a sealing means for closing the opening formed at the printhead holder, i.e., to press directly against the printhead holder, for example, during a wet cleaning process of the printer device, for which a web of packaging material is removed from the printer device. On the other hand, the sealing unit may be used to press the web of packaging material guided inside the printing device against the opening formed on the printhead holder by moving the sealing unit to the second position, for example for an interruption of the printing process or for a format or tool change on the packaging machine. This allows the printhead nozzle to be prevented from drying out.

The opening for the printhead nozzle may in principle be formed by the printhead holder alone or by the printhead holder and at least one other component mounted thereon, for example a cartridge of the printhead.

Preferably, the printer device has a plurality of printhead holders, for example four printhead holders mounted next to one another, in particular offset from one another in the production direction of the packaging machine, whose respective openings may be closed together by means of the sealing unit when the sealing unit is moved into the second position. This enables sealing of several nozzles on the printer device at once, i.e., together by means of one mechanism, which considerably simplifies the setting of the printer device for a wet cleaning process.

In one variant the sealing unit is provided in the form of a pressure plate. By means of the pressure plate, the respective openings of the printhead holders may be closed together when the pressure plate is stored in the second position. Acting as a pressure plate, the sealing unit is compact in volume and may therefore be installed in a confined space within the printer device and may be adjusted between the first and second positions. The pressure plate may have substantially a width formed in accordance with a width of the material tracks to be printed.

Conceivably, the pressure plate may be mounted in the second position inclined at a predetermined angle to the horizontal. In particular, the pressure plate may be inclined towards an outlet of the printer device, i.e., it forms a slope towards the outlet. Accordingly, the printhead holders may be mounted in an inclined manner, i.e., aligned substantially perpendicular to the inclined pressure plate. As a result of this, a cleaning fluid is able to flow off more easily.

In particular, the pressure plate has a sealing layer made of silicone facing the printhead holders. This sealing layer forms an elastic coating that is easy to clean and exhibits excellent sealing behavior when the printhead holders press against it. The sealing layer may have a thickness of up to 1 cm. The pressure plate may be completely embedded in silicone, so that when a predetermined number of operating hours is reached, the pressure plate may be rotated to serve as a sealing unit with its other side.

An advantageous sealing effect is achieved on the pressure plate in particular if its sealing layer has a Shore hardness between 20 and 60 Shore, and preferably a Shore hardness between 30 and 50 Shore.

The sealing layer may be used for all printhead holders when the pressure plate is in the second position, i.e., presses against the printhead holders with a predetermined pressure force.

According to one embodiment of the disclosure, the printhead holder includes at least one protruding sealing contour surrounding the opening on a side facing the sealing unit. The sealing contour may have a rounded cross-section facing the sealing unit. The sealing contour may be part of a milled component that is attached to the printhead holder and forms the opening on the printhead holder. The sealing contour may be pressed into the sealing layer of the pressure plate with an indentation depth corresponding to the shape when the pressure plate is mounted in the second position. In this way, both a form-fit and a force-fit seal may be effectively achieved for sealing the printhead holder.

The sealing contour may have a substantially concentric shape with respect to the opening, such as being annular, square or rectangular concentric with respect to the opening. Conceivably, the sealing contour may be arranged as a toric closed frame around the opening.

It is conceivable that the sealing unit includes, on a side facing the printhead holder, at least one sealing contour for form-fit closure of the opening formed on the printhead holder. In one variant this sealing contour is an elevation of the sealing layer formed from silicone, which is adapted to the shape of the opening. Alternatively, a plurality of sealing recesses may be formed in the sealing layer, into which the respective printhead holders may be inserted in order to seal the openings formed thereon.

Preferably, the lifting mechanism includes an actuating lever for manually adjusting the sealing unit between the first position and the second position. This allows the lifting mechanism to be easily used by an operator in order to adjust the sealing unit. In addition, this eliminates the need to interact with the printhead and its vicinity area, which could potentially contaminate or damage sensitive components, such as the printhead nozzle.

It is advantageous if the lifting mechanism includes at least one toggle lever. This lever may be mounted as a force intensifier between the actuating lever and the pressure plate. The toggle lever may be used to generate a desired pressing force or sealing force by means of the pressure plate acting against the printhead holders.

Conceivably, the lifting mechanism may be adjustable by means of a pneumatic actuator or by means of a motorized actuator, for example by means of a servomotor, to adjust the pressure plate between the first position and the second position. If necessary, the activation of a cleaning process or an interruption of the printing process may cause the lifting mechanism to automatically adjust the pressure plate from the first position to the second position.

According to a preferred variant, the printhead holder or the respective printhead holders have a cover for a cartridge integrated on the printhead. The printhead holder, in particular the printhead, may thus be kept clean more easily. In particular, the cover even simplifies the sealing of the printhead holder(s) for a wet cleaning process.

It is conceivable for the cover to be a cap-shaped injection-molded part detachably attached to the printhead holder. It is conceivable for the cover to remain permanently mounted on the printhead holder and to be removed from the printhead holder only for replacement of the printhead including the cartridge integrated thereon. In this way, the printhead installed in the printhead holder, including its cartridge, remains well protected throughout its use.

The printer device according to the disclosure is used in particular on a packaging machine, preferably on a thermoforming packaging machine. It is conceivable that the printer device is mounted on an inlet of a sealing station of the thermoforming packaging machine. Conceivably, the printer device may be mounted on a top foil device of the thermoforming packaging machine, wherein the printer device is configured as a direct foil printer for printing on a top foil web transported by means of the top foil device.

Furthermore, the disclosure relates to a wet cleaning process of a packaging machine, in particular a printer device attached thereto, which is configured for printing a web of packaging material. The wet cleaning process according to the disclosure includes the following steps:

- removing at least a section of the web of packaging material passed between at least one printhead holder installed on the printer device and a sealing unit adjustably mounted on the printer device,
- moving the sealing unit by means of a lifting mechanism installed on the printer device from a first position, in which the sealing unit exposes an opening formed on the printhead holder for a nozzle of a printhead carried thereon, to a second position, approaching the printhead holder, in which the sealing unit closes the opening of the printhead holder, and
- wet cleaning the printer device by means of a cleaning fluid.

In this way, the printer device may be quickly prepared for wet cleaning by simple technical means, so that overall downtimes of the packaging machine may be reduced.

It is conceivable for the sealing unit to be in the form of a pressure plate, which is moved into the second position by means of the lifting mechanism, so that the pressure plate seals at once all the print head holders, in particular all the openings formed thereon for the nozzles. Preferably, several printhead holders on the printer device are sealed simultaneously by means of the pressure plate when it is moved into the second position.

In one variant the pressure plate in the second position is moved to an orientation inclined to the horizontal, so that a cleaning fluid in contact with the pressure plate may flow off more efficiently.

Advantageously, sealing of the plurality of printhead holders may be accomplished by an operator depressing an actuation lever associated with the lifting mechanism. In particular, the actuation lever is used to adjust a toggle lever of the lifting mechanism coupled thereto, by which the pressure plate may be moved from the first position to the second position.

According to one embodiment, the pressure plate may be used to press the web of packaging material against the opening to close it. The pressing of the packaging material web may be dampened, for example, by means of a pendulum guide.

BRIEF DESCRIPTION OF THE DRAWINGS

The disclosure is explained in more detail with reference to the following figures. In the drawings.

Throughout the drawings identical components are marked with the same reference signs.

DETAILED DESCRIPTION

Figure 1:
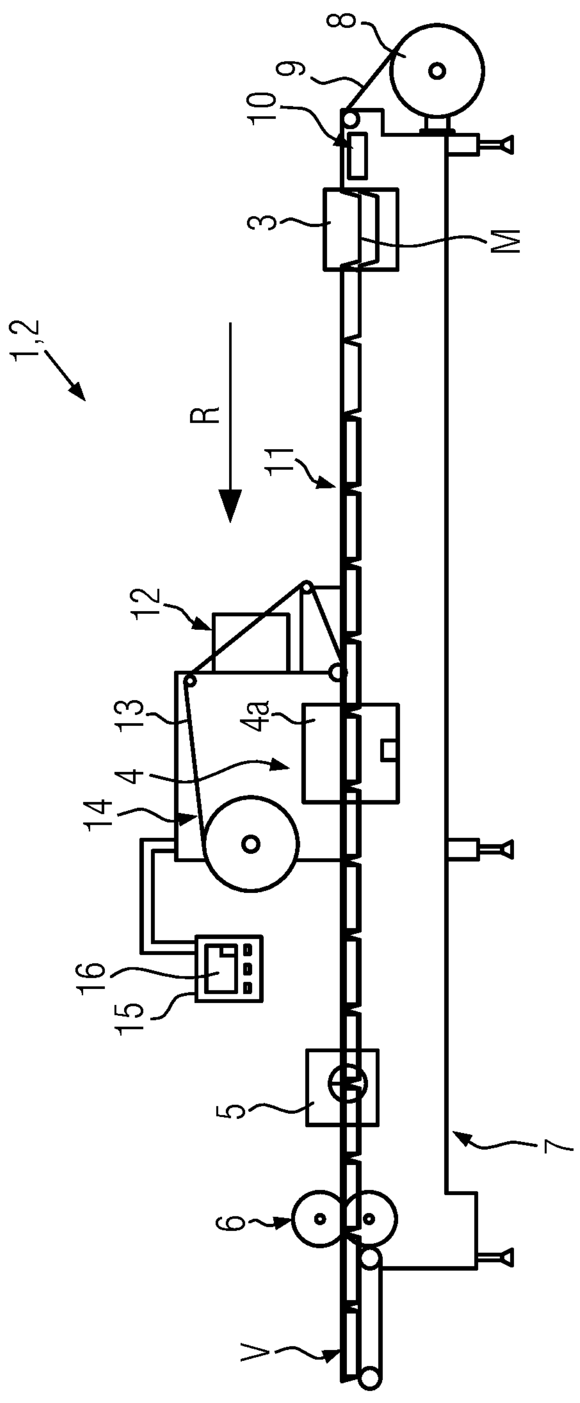
FIG. 1 is a side view of a schematically illustrated packaging machine in the form of a thermoforming packaging machine.

FIG. 1 shows a packaging machine 1 configured as an intermittently operating thermoforming packaging machine 2. This thermoforming packaging machine 2 has a forming station 3, a sealing station 4, a transverse cutting device 5 and a longitudinal cutting device 6, which are arranged in this order in a production direction R on a machine frame 7. On the input side, a feed roller 8 is located on the machine frame 7, from which a bottom foil 9 is drawn off. Furthermore, the thermoforming packaging machine 2 has a transport chain 10, which engages with the bottom web 9 and transports it further in production direction R with each main operating cycle.

In the embodiment shown, the forming station 2 is configured as a thermoforming station, in which packaging trays M are formed in the bottom foil 9 by thermoforming, for example by means of compressed air and/or vacuum. The forming station 3 may be configured such that several packaging trays M are formed next to each other in the direction perpendicular to the production direction R. This means that several packaging trays M may be formed in the same direction. In this way, trays M may be produced in several tracks lying next to each other with respect to the production direction R.

Downstream of forming station 3 with respect to the production direction R, a filling section or insertion region 11 is provided, along which the packaging trays M are filled with products. Filling of the packaging trays M may be performed manually by an operator or mechanically by a picker.

A printer device 12 is arranged upstream of the sealing station 4 in the production direction R, which is configured in the form of a thermal inkjet printer (TIJ). The printer device 12 is configured to print on a top foil 13, for example to provide it with an imprint containing, for example, information regarding the product inserted in the packaging tray M.

The sealing station 4 has a hermetically sealable chamber 4*a*, in which the atmosphere in the packaging trays M may be removed and/or replaced, for example, by gas purging with an exchange gas or with a gas mixture, before sealing with the upper foil 13 dispensed from a foil holder 14.

The transverse-cutting device 5 may be configured as a punch, which cuts through the bottom foil 9 and the top foil 13 in a direction transverse to the production direction R between adjacent packaging trays M. The transverse-cutting device 5 operates such that the bottom foil 9 is not cut across its entire width, but is not cut through at least in an edge region. This enables controlled advancement by the transport chain 10.

The longitudinal cutting device 6 may be configured as a knife arrangement, with which the bottom foil 9 and the top foil 13 are cut between adjacent packaging trays M and at the lateral edge of the bottom foil 9 in the production direction R, so that singulated packages V are present downstream of the longitudinal cutting device 6.

The thermoforming packaging machine also has a control device 15, which has the task of controlling and monitoring the processes running in the thermoforming packaging machine 2. A display device 16 is used to visualize or influence the process sequences in the thermoforming packaging machine 2 for or by an operator.

Figure 2:
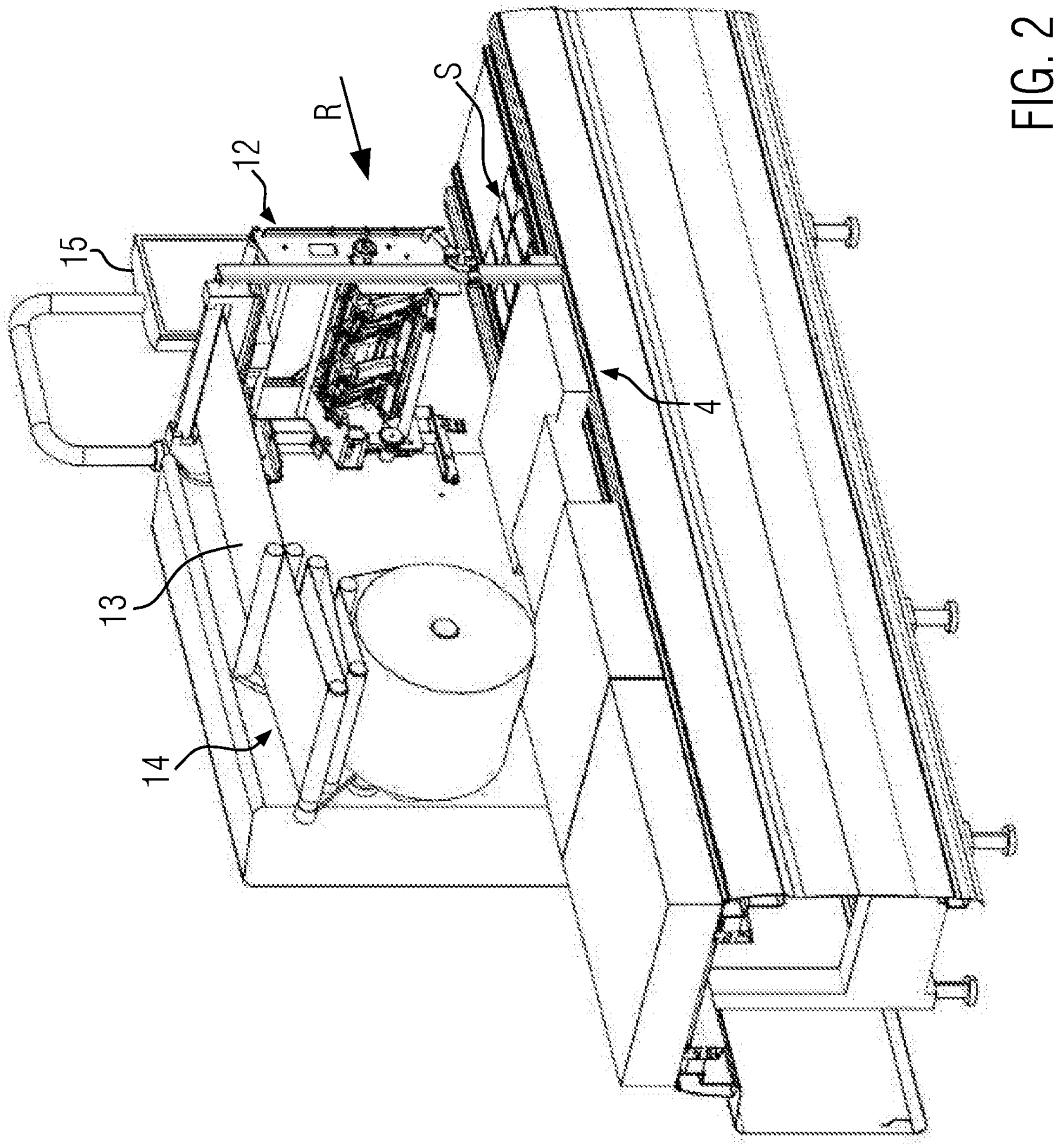
FIG. 2 is a perspective view of a section of a thermoforming packaging machine including a printer device.

FIG. 2 shows a section of the thermoforming packaging machine 2 in perspective view. The printer device 12 is arranged at the entrance of the sealing station 4. Operation of the printer device 12 may be controlled and monitored by means of the control device 15. According to FIG. 2, the printer device 12 is configured as a thermal inkjet printer and is set to print on four tracks S.

Figure 3A:
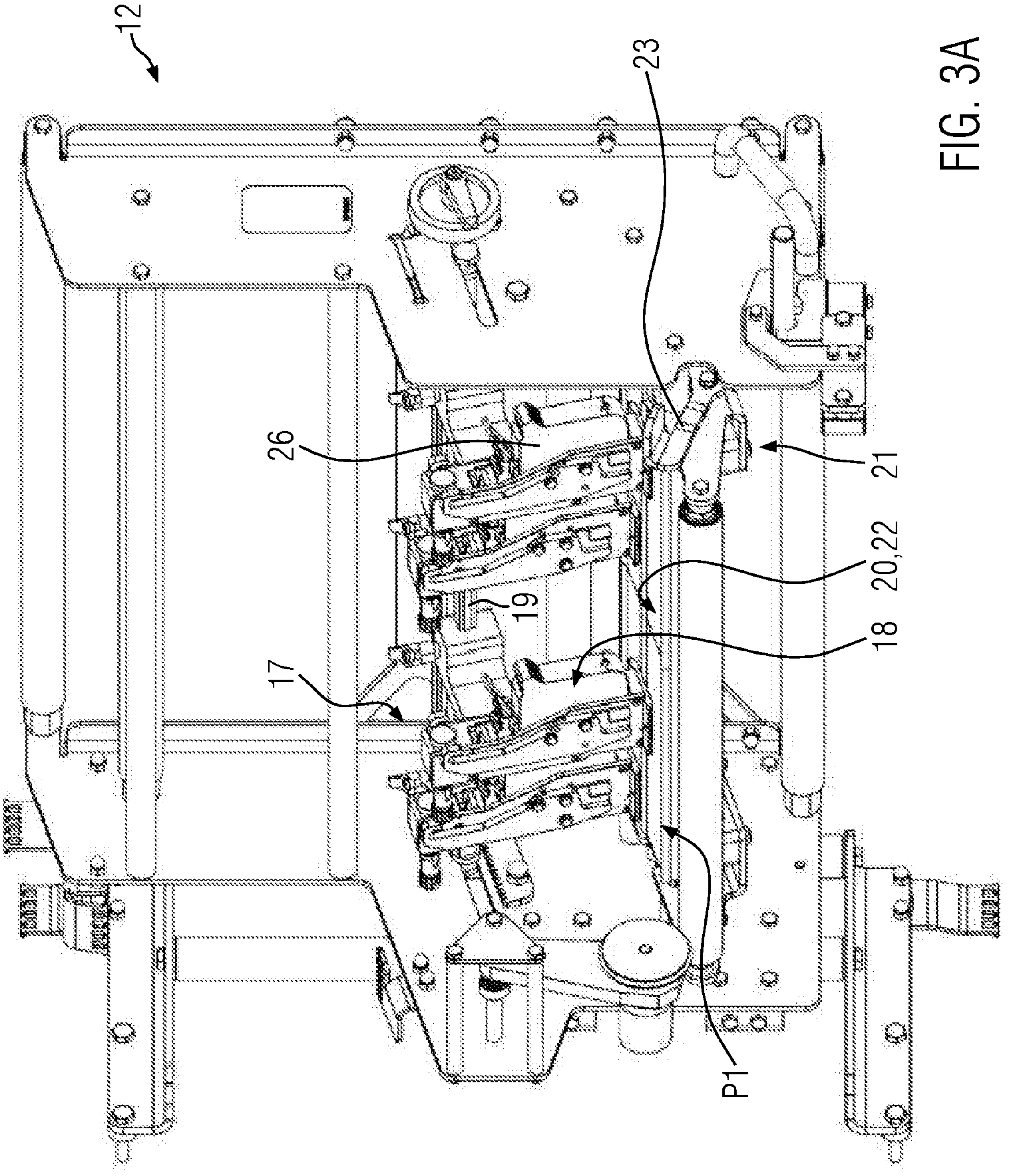
FIG. 3A is an isolated representation of the printer device of FIG. 2 in an operating position.

In FIG. 3A, the printer device 12 is shown in isolation. The printer device 12 has a plurality of printhead holders 17 configured to support replaceable printheads 18. Referring to FIG. 3A, the printhead holders 17 are attached to a frame 19 of the printer device 12. The printhead holders 17 are slidably arranged along the frame 19.

In addition, FIG. 3A shows a sealing unit 20 below the respective printhead holders 17 as well as a lifting mechanism 21 for the sealing unit 20. In FIG. 3A, the sealing unit 20 is provided in the form of a pressure plate 22.

FIG. 3A shows the printer device 12 in a working position, in which the pressure plate 22 is set in a first position P1 spaced from the printhead holders 17, in which the pressure plate 22 releases the respective printheads 18 mounted on the printhead holders 17 for a printing process for producing an imprint on the top foil 13.

Figure 3B:
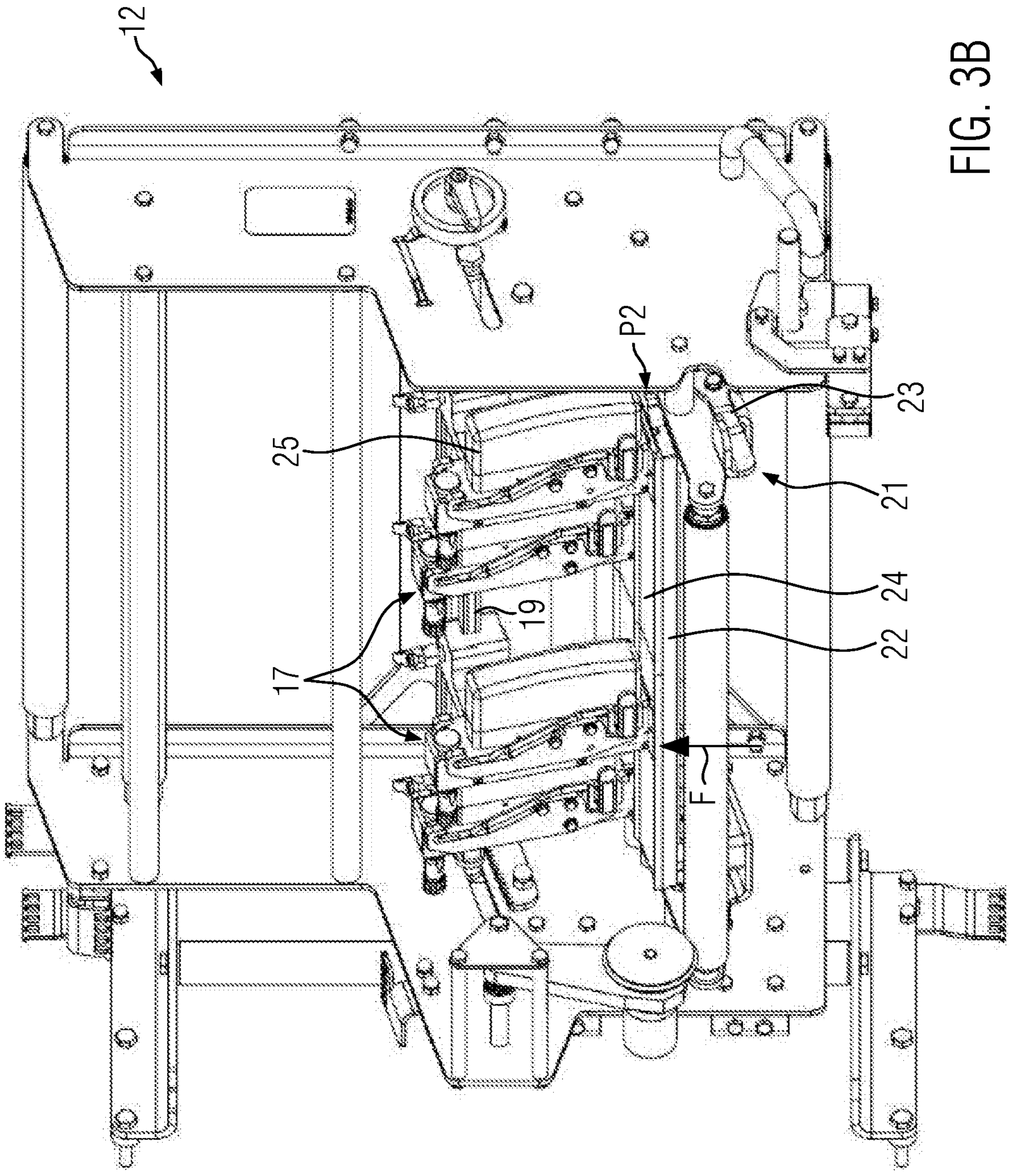
FIG. 3B shows the printer device of FIG. 3A in a wet cleaning process position.

By means of the lifting mechanism 21, the pressure plate 22 may be moved from the first position P1 shown in FIG. 3A to the second position P2 shown in FIG. 3B, which is closer to the print head holders 17. For this purpose, an actuation lever 23 is pressed down by an operator, i.e., into the position shown in FIG. 3B.

According to FIG. 3B, the printer device 12 is in a cleaning position. In this position, the pressure plate 22 is in the second position P2 and exerts a sealing force F from below against the printhead holders 17 in order to seal the printhead holders 17, in particular the printheads 18 mounted thereon, for a cleaning process.

Furthermore, FIG. 3B shows that a sealing layer 24 is formed on the pressure plate 22 on a side facing the printhead holders 17. This sealing layer 24 is made in particular of silicone, preferably with a Shore hardness between 20 and 60 Shore.

The sealing force F acting on the printhead holders 17 in the cleaning position may be generated specifically by means of a toggle joint coupled to the actuating lever 23, which is not shown.

FIGS. 3A and 3B show that by means of the actuation lever 23, the pressure plate 22 may be moved from the first position P1 to the second position P2, thereby simultaneously sealing all printhead holders 17 attached to the printer device 12. Thus, the printer device 12 is quickly set for a cleaning process of the thermoforming packaging machine 2.

FIG. 3B further shows that covers 25 are attached to the respective printhead holders 17 to cover cartridges 26 (see FIG. 3A) integral with the respective printheads 18 so that they are mounted to the printhead holders 17 in a protected manner. The covers 25 may be removed from the printhead holders 17 for replacement of the printheads 18 mounted thereon. However, normally the covers 25 remain mounted on the respective printhead holders 17 during operation of the thermoforming packaging machine 2 and in particular during the cleaning process of the thermoforming packaging machine 2.

Figure 4A:
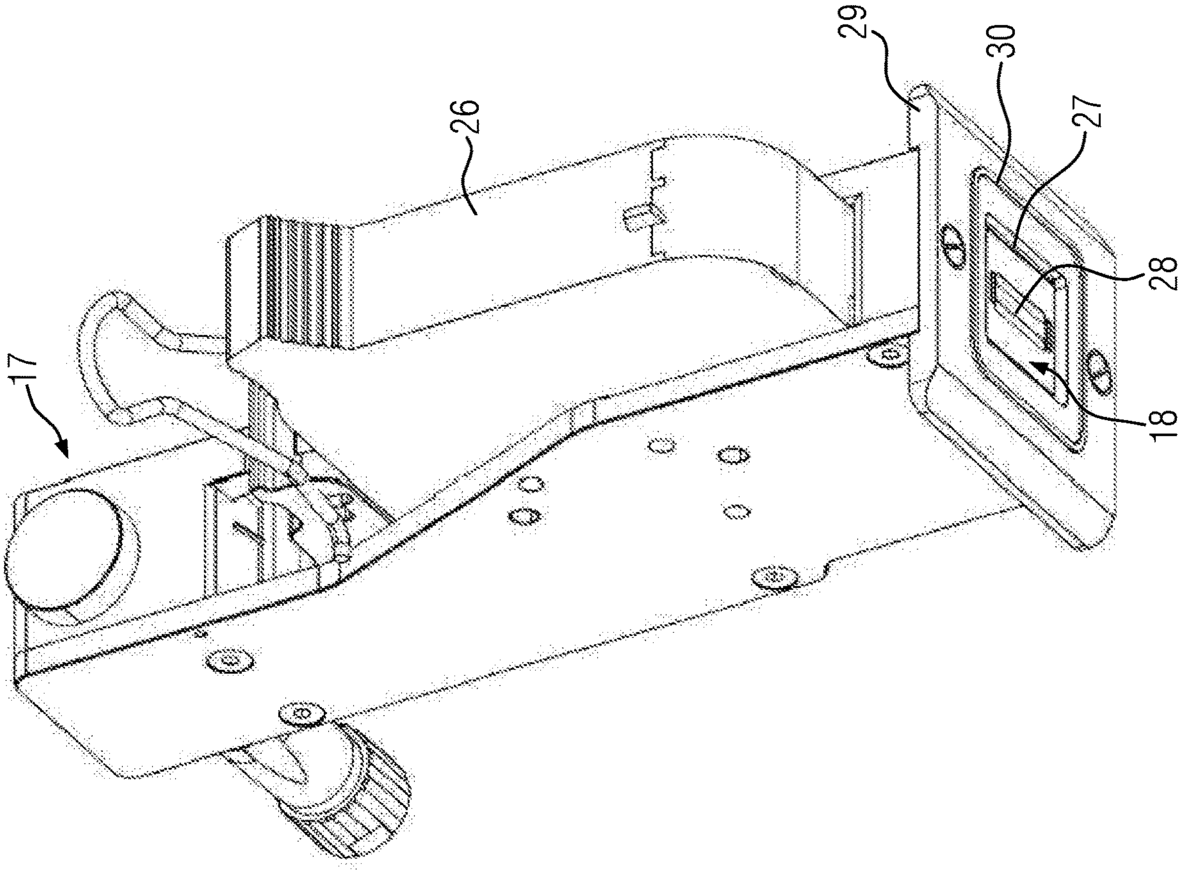
FIG. 4A is an isolated view of a printhead holder with a printhead mounted thereon.

FIG. 4A shows a printhead holder 17 in isolated view. A printhead 18 is installed on the printhead holder 17 shown in FIG. 4A. The printhead holder 17 has an opening 27 for a nozzle 28 formed on the printhead 18. The opening 27 may be of any shape. In FIG. 4A, the opening 27 is formed in a plate 29 that is bolted to the printhead holder 17. The plate 29 has a convex sealing contour 30 that extends around the opening 27. By exerting the sealing force F (see FIG. 3B), the sealing contour 30 is pressed into the sealing layer 24 of the pressure plate 22 to seal the opening 27. If necessary, a sealing contour formed in the sealing layer 24 may also be formed and engage positively in the opening 27 to achieve a particularly high sealing effect.

Figure 4B:
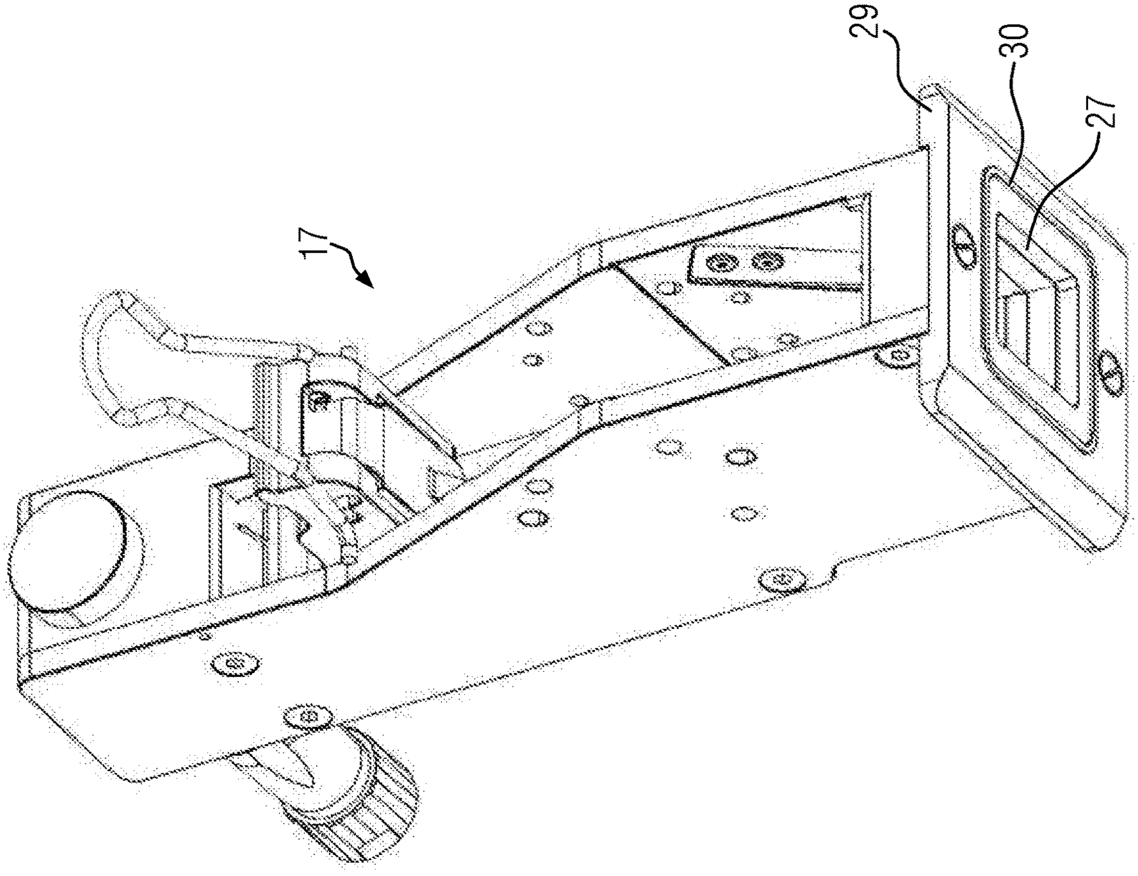
FIG. 4B shows the printhead holder of FIG. 4A without a printhead installed thereon.

FIG. 4B shows the printhead holder 17 of FIG. 4A without the printhead 18 installed therein.

It is conceivable, as an alternative to manual actuation, to actuate the lifting mechanism 21 shown in FIGS. 3A and 3B by means of a drive, preferably pneumatic or motorized, which may be controlled by means of the control device 15, in order to adjust the pressure plate 22 between the first position P1 and the second position P2. If necessary, activating a cleaning operation on the display device 16 may cause the printer device 12 to automatically move to the cleaning position shown in FIG. 3B.

What is claimed is:

1. A printer device configured for a packaging machine as a thermal inkjet printer, the printer device comprising a frame and a printhead holder mounted thereon and configured to support a replaceable printhead, the printhead holder having an opening for at least one nozzle formed on the printhead, wherein the printer device further comprises a sealing unit and a lifting mechanism for the sealing unit, by means of which the sealing unit is adjustable between a first position, in which the sealing unit exposes the opening of the printhead holder, and a second position, in which the sealing unit closes the opening of the printhead holder, and wherein the sealing unit is configured as a pressure plate.

2. The printer device according to claim 1, wherein the printer device has a plurality of the printhead holders, respective openings of which are able to be closed together by means of the sealing unit when the sealing unit is adjusted to the second position.

3. The printer device according to claim 2, wherein the pressure plate has a sealing layer, which faces the printhead holders and is made from silicone.

4. The printer device according to claim 3, wherein the sealing layer has a Shore hardness between 20 and 60 Shore.

5. The printer device according to claim 3, wherein the sealing layer has a Shore hardness between 30 and 50 Shore.

6. The printer device according to claim 1, wherein the printhead holder comprises, on a side facing the sealing unit, at least one projecting sealing contour surrounding the opening, and/or the sealing unit comprises, on a side facing the printhead holder, at least one sealing contour for closing the opening of the printhead holder.

7. The printer device according to claim 1, wherein the lifting mechanism has an actuation lever for manually moving the sealing unit between the first position and the second position.

8. The printer device according to claim 1, wherein the lifting mechanism comprises at least one toggle lever.

9. The printer device according to claim 1, further comprising a cover attached to the printhead holder for covering a cartridge integrated on the printhead.

10. The printer device according to claim 9, wherein the cover is a cap-shaped injection-molded part detachably attached to the printhead holder.

11. A packaging machine comprising the printer device according to claim 1.

12. The packaging machine according to claim 11, wherein the packaging machine comprises a thermoforming packaging machine.

13. A wet cleaning process of a printer device installed on a packaging machine for printing a web of packaging material, the process comprising:

removing at least a portion of the web of packaging material passed between a printhead holder installed on the printer device and a sealing unit adjustably supported on the printer device;

moving the sealing unit using a lifting mechanism installed on the printer device from a first position, in which the sealing unit exposes an opening formed on the printhead holder for a nozzle of a printhead attached thereon, to a second position approaching the printhead holder, in which the sealing unit closes the opening of the printhead holder, wherein the sealing unit is configured as a pressure plate; and wet cleaning the printer device using a cleaning fluid.

14. The method according to claim 13, wherein the pressure plate comprises a sealing layer, which faces the printhead holder and is made from silicone.

15. The method according to claim 14, wherein the sealing layer has a Shore hardness between 20 and 60 Shore.

16. The method according to claim 13, wherein the printer device has a plurality of the printhead holders, respective openings of which are able to be closed together by the sealing unit when the sealing unit is adjusted to the second position.

17. The method according to claim 13, wherein the printhead holder comprises, on a side facing the sealing unit, at least one projecting sealing contour surrounding the opening, and/or the sealing unit comprises, on a side facing the printhead holder, at least one sealing contour for closing the opening of the printhead holder.

* * * * *